United States Patent [19]
Benke

[11] Patent Number: 4,814,151
[45] Date of Patent: Mar. 21, 1989

[54] SODA ASH MANUFACTURE

[75] Inventor: Alan H. Benke, El Cerrito, Calif.

[73] Assignee: Stauffer Chemical Company, Shelton, Conn.

[21] Appl. No.: 77,577

[22] Filed: Jul. 23, 1987

[51] Int. Cl.$^4$ .......................... C01D 7/12; C01D 7/00; C22B 26/10
[52] U.S. Cl. .................... 423/206 T; 423/421; 23/302 T
[58] Field of Search .............. 423/206 T, 421; 23/302 T

[56] References Cited
U.S. PATENT DOCUMENTS

| | | | |
|---|---|---|---|
| 3,260,567 | 7/1966 | Hellmers et al. | 423/206 T |
| 3,528,766 | 9/1970 | Coglaiti et al. | 423/206 T |
| 3,933,977 | 1/1976 | Ilardi et al. | 423/206 T |
| 4,039,617 | 8/1977 | Kuo | 423/206 T |
| 4,075,281 | 2/1978 | Port et al. | 423/206 T |
| 4,299,799 | 11/1981 | Ilardi et al. | 423/206 T |

Primary Examiner—Gary P. Straub
Attorney, Agent, or Firm—Paul J. Juettner

[57] ABSTRACT

An improved process for the manufacture of soda ash from trona by the sodium carbonate monohydrate method utilizing an activated carbon treatment of evaporator fines bleed.

2 Claims, 2 Drawing Sheets

SODA ASH MANUFACTURE

BACKGROUND OF THE INVENTION

Trona is a mineral found in large underground deposits near Green River, Wyo., and contains around 90% sodium sesquicarbonate, $Na_2CO_3 \cdot NaHCO_3 \cdot 2H_2O$ and the remainder of waste materials including marlstone, oil shale, shortite and organic impurities in addition to a small amount of free water. The sodium sesquicarbonate content of the trona is commerically important in the manufacture of soda ash (sodium carbonate).

One process for the manufacture of soda ash from trona is the so-called "Monohydrate Process". In this process, the mined trona ore is crushed into small pieces, which are calcined to impure soda ash. The calcining step removes some of the organic matter naturally found in the ore. The impure soda ash is then dissolved in a dissolver unit using natural river water and recycled condensate. The dissolver contains insolubles in addition to the sodium carbonate in solution. The material from the dissolver is transferred to a rake classifier where substantially all of the large pieces of insoluble material is removed. The solution coming from the rake classifier is conveyed to a settler (thickener) for removal of fine insolubles. The overflow from the thickener is treated with activated carbon to remove substantially all the undesirable dissolved organic impurities. Normally the activated carbon-treated solution is filtered in a leaf-type pressure filter to separate the spent activated carbon. The stream from the pressure filter is passed through a polish filter to remove small amounts of suspended activated carbon. The clear filtered solution of sodium carbonate is conveyed to an evaporator for removal of water, resulting in the crystallizing of sodium carbonate monohydrate. Sodium carbonate monohydrate crystals are separated from mother liquor and dried in a calciner to produce high grade sodium carbonate. The mother liquor is recycled to the evaporator or purged to containment ponds.

Processes of this type are disclosed in many publications, including U.S. Pat. Nos. 2,343,080; 2,343,081; 2,770,524; 2,962,348; 3,131,996; 3,260,567; and 3,528,766.

Organic impurities are naturally present in the trona and dissolve in the process sodium carbonate solution. During continuous plant production of soda ash the concentration of these organic impurities builds up in the crystallizer. When the concentration reaches a certain critical level, unexceptable foaming occurs in the crystallizer. The concentration of the dissolved organic impurities in the crystallizer can be controlled by several methods.

Previously, several techniques have been used to reduce the concentration of soluble organics in the evaporator. One method that has been used is to purge the crystallizer of small amounts of saturated sodium carbonate solution containing the high concetnration of dissolved organic impurities and replace it with feed solution of sodium carbonate wherein the organic impurity concentrations are very low. This method is not preferred as it creates pollution problems with the purge stream.

A second method for removing dissolved organic material is to bleed-off a stream of purge liquor from the evaporator solution and combine it with the stream of clarified and filtered solution of sodium carbonate before it is treated with an absorbent, such as activated carbon. Generally, this method is an effective means of reducing the concentration of soluble organic impurities, but large amounts of activated carbon are required to perform this double treatment.

A variety of anti-foaming agents are added to the evaporator solution to control foam. This method is operative but creates an added expense and will not prevent foaming when the concentration of dissolved organic impurities becomes very high.

BRIEF DESCRIPTION OF THE INVENTION

It has been discovered that the concentration of soluble organic impurities in the evaporator can be controlled by bleeding a recycle liquor stream of saturated mother liquor from the evaporator, passing it though an adsorbent such as activated carbon to adsorb the soluble organic impurities, filtering the treated bleed stream to separate the spent carbon and then combining the treated bleed stream with the regular clarified and filtered stream of sodium carbonate at a point in the process before or after a treatment with activated carbon at reduced amounts.

DETAILED DESCRIPTION OF THE INVENTION AND DRAWINGS

Figure 1:
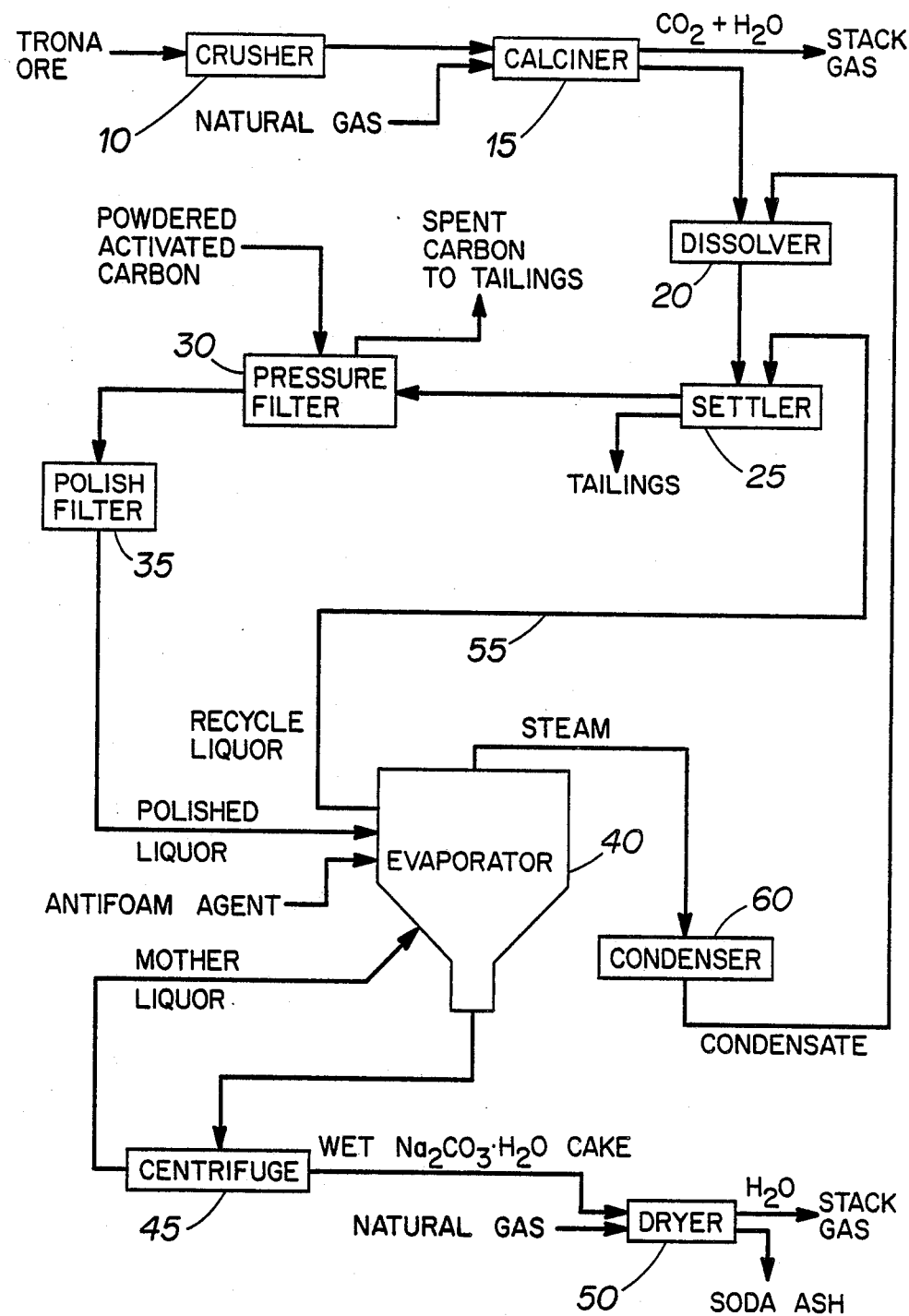
FIG. 1 is a schematic illustration of a conventional process for preparing soda ash by the monohydrate process.
Figure 2:
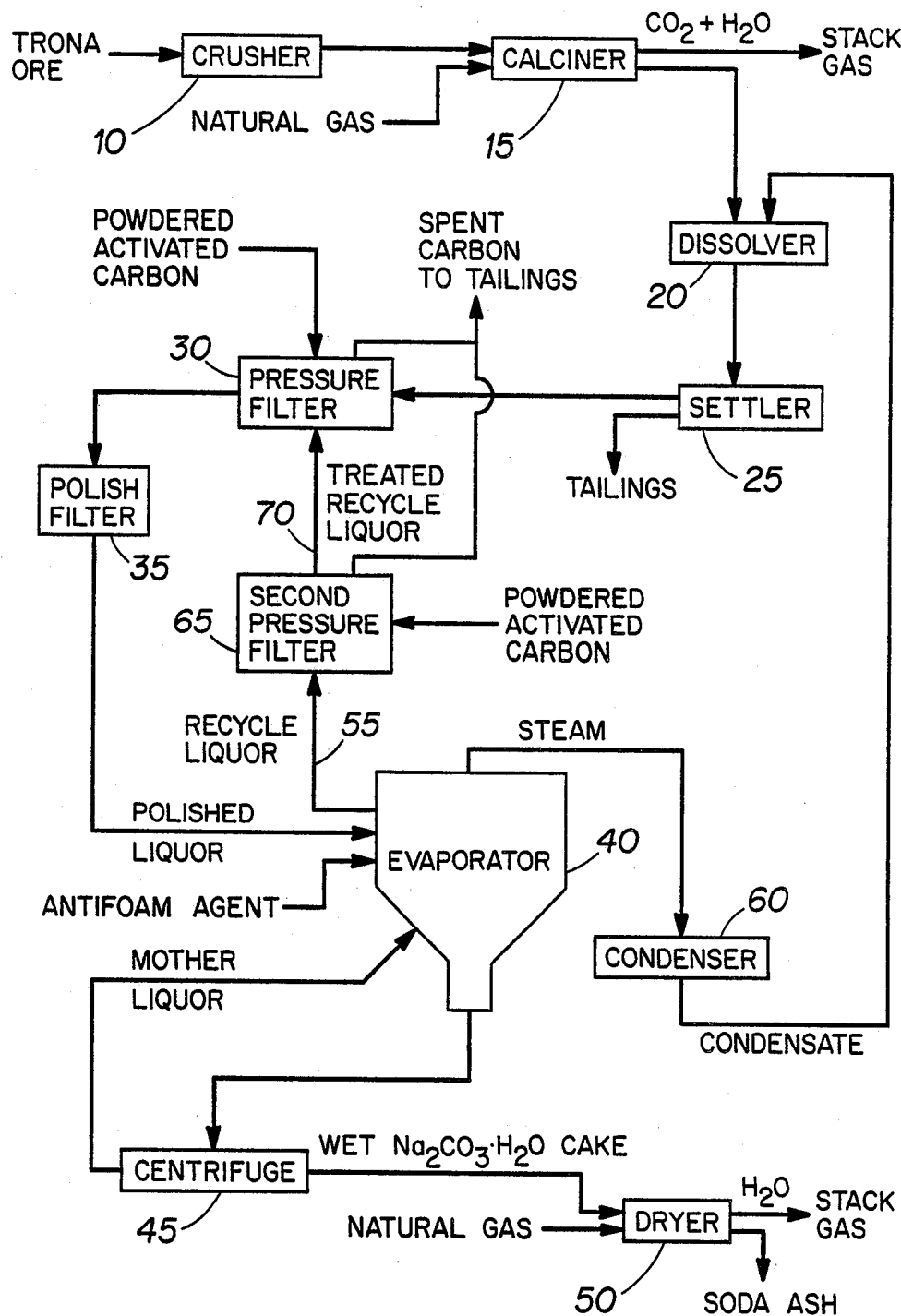
FIG. 2 is a schematic illustration embodying the principles of the present invention.

Referring to FIGS. 1 and 2, trona ore is fed to a crusher 10 wherein the ore is broken to a ⅜-inch maximum size. The crushed ore is conveyed to a gas-fired co-current rotary calciner 15 wherein the ore is heated to 150°–180° C. Carbon dioxide and water vapor are exhausted as stack gas. The hot ore is conveyed to a dissolver 20 where it is mixed with water to form a slurry of dissolved sodium carbonate containing insolubles. The mixture is conveyed to a settler (thickener) 25 after larger solid particles have been removed in a conventional classifier (not shown). The solution from the settler 25, which contains small insoluble particles, is forced through a pressure filter 30 (leaf type) after being contacted with activated carbon. The activated carbon substantially removes dissolved organic impurities by adsorption. Spent activated carbon is removed from pressure filter 30 and periodically sent to waste.

The treated solution of sodium carbonate is passed to a conventional polish filter 35 where residual activated carbon fines are removed. The exiting polished liquor is fed to evaporator 40. Evaporated water is recovered in condenser 60 and conveyed to dissolver 20.

A slurry of crystallized sodium carbonate monohydrate in a saturated solution of sodium carbonate (mother liquor) is passed through centrifuge 45. Mother liquor is returned to the evaporator. The centrifuge cake of wet sodium carbonate monohydrate crystals is conveyed to a gas-fired dryer 50 where the monohydrate crystals are converted to pure soda ash. Water vapor is exhausted as stack gas.

Referring to FIG. 1, a recycle liquor stream 55 of mother liquor containing dissolved sodium carbonate and dissolved organic impurities which have built up to higher concentrations during the continuous operation of evaporator 40 is conveyed to settler 25. This stream combines with the sodium carbonate solution from dissolver 20 and the combined solutions are treated with actived carbon to remove dissolved organic impurities.

Referring to FIG. 2, recycle liquor stream 55 is contacted with activated carbon to adsorb the high concentrations of dissolved organic impurities. A second pressure filter 65 is used to separate spent activated carbon. Periodically, the spent carbon is sent to waste. The treated recycle liquor stream 70 is fed to pressure filter 30 or to polish filter 35, wherein it it combined with the conventionally treated solution of sodium carbonate.

EXAMPLE

A plant test was conducted over a three-week period to ascertain the effectiveness of the improved process illustrated by FIG. 2 as compared to the conventional process illustrated by FIG. 1 in reducing the amount of activated carbon to control the concentration of soluble organics in the crystallizer.

As previously stated, in the continuous production of soda ash in a large scale plant, the level of soluble organic compounds slowly builds up in the evaporator. When the level reaches a certain critical concentration foaming starts which disrupts production at this point. The concentration of soluble organics must be reduced. The concentration of the soluble organics was computed using an analytical method utilizing ultraviolet (UV) light transmittance of liquor samples from the crystallizer. The ultraviolet light absorbance is proportional to the concentration of soluble organic impurities in the sample.

Utilizing the process illustrated by FIG. 1, the amount of activated carbon used in pressure filter 30 was determined so that an acceptable concentration of soluble organic impurities in the crystallizer could be maintained. A typical weight of activated carbon usage for pressure filter 30 was found to range from 1.23 to 1.43 pounds per ton of produced soda ash. This amount is the "normal" activated carbon usage.

When the process illustrated by FIG. 2 was substituted for the process illustrated by FIG. 1, the total amount of activated carbon used in pressure filters 30 and 65 was found to typically range from 0.58 of the 0.75 pounds per ton of produced soda ash. This amount is about 50% on normal activated carbon usage. An acceptable level of soluble organic impurities in the evaporator was maintained, as measured by ultraviolet absorbance.

A typical amount of activated carbon for pressure filter 30 was found to range from 0.20 to 0.32 pounds per ton of produced soda ash, while the typical amount of activated carbon for pressure filter 65 was found to range from 0.38 to 0.46 pounds per ton of produced soda ash.

As can be realized, the improved process of this invention results in substantial savings in the cost of activated carbon.

What is claimed is:

1. In a process for the manufacture of sodium carbonate from mined trona ore comprising:
    (a) Crushing the crude trona ore;
    (b) Calcining the crushed trona at a temperature and from a time sufficient to convert the crushed trona into crude sodium carbonate, but insufficient to remove substantial quantities of soluble organic impurities;
    (c) Dissolving the calcined crude sodium carbonate in water to form an aqueous solution of crude sodium carbonate;
    (d) Clarifying and filtering the solution of crude sodium carbonate to remove insolubles;
    (e) Contacting the clarified and filtered aqueous solution of sodium carbonate with a first batch of activated carbon to absorb and remove substantial amounts of soluble organic impurities from the aqueous solution at sodium carbonate;
    (f) Polish filtering the aqueous solution of sodium carbonate to remove residual amounts of activated charcoal;
    (g) Crystallizing and separating sodium carbonate monohydrate crystals from the activated carbon treated aqueous solution of sodium carbonate while recycling mother liquor to the crystallizing step; and
    (h) Calcining the separated sodium carbonate monohydrate crystals to form sodium carbonate crystals;
    (i) Bleeding a recycle liquor stream of saturated liquor from the evaporator; the improvement which comprises:
    (I) Contacting the recycle liquor stream of saturated mother liquor of Step (i) with activated carbona apart from the activated carbon of Step (e) to absorb soluble orgainic impurities and remove them by filtration; and
    (II) Combining the treated recycle liquor stream of saturated mother liquor of Step (I) with the clarified and filtered aqueous solution of sodium carbonate of Step (d) before it is treated with activated carbon in Step (e).

2. The process as cited in claim 1 wherein the amount of activated carbon used in step (e) ranges from about 0.20 to about 0.32 and the amount of activated carbon used in step (I) ranges from about 0.38 to about 0.46 and the total amount of activated carbon ranges from about 0.58 to about 0.78 pounds per ton of soda ash produced in step (h).

* * * * *